3,483,202
3,4-DIAZAPREGNANES
Seymour D. Levine, North Brunswick, N.J., assignor to E. R. Squibb & Sons, Inc., New York, N.Y., a corporation of Delaware
No Drawing. Filed July 3, 1967, Ser. No. 650,601
Int. Cl. C07d 51/00
U.S. Cl. 260—250
8 Claims

ABSTRACT OF THE DISCLOSURE

This application relates to 3,4-diazapregnanes and their intermediates which are useful as anti-androgens.

---

This invention relates to new steroidal compounds and, more particularly, to new steroids of the 3,4-diaza-$\Delta^{1,4}$-pregnane series, new intermediates useful in the preparation of the same, and processes for preparing the same.

The new final products of this invention are of the Formula I

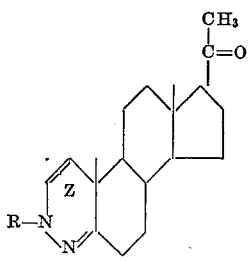

wherein R is lower alkyl, aryl, aryl(lower alkyl), halo-lower alkyl, halo-aryl, haloaryl(lower alkyl), or trifluoromethyl-aryl; Z is selected from the group consisting of

and

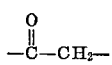

Among the suitable values for R may be mentioned lower alkyl (e.g., methyl, ethyl, n-butyl and n-hexyl); aryl (e.g., phenyl, naphthyl, o, m, and p-tolyl and the xylyls); aryl(lower alkyl) (e.g., benzyl, phenethyl and β-phenylpropyl); halo substituted lower alkyl (e.g., 2-chloroethyl and 2,3-difluoroethyl and 2,2,2-trifluoroethyl); halo substituted aryl (e.g., o-chlorophenyl, p-fluorophenyl and o, p-dibromophenyl); halo-substituted aryl(lower alkyl) (e.g., p-chlorobenzyl and o-iodophenethyl); and trifluoromethylaryl (e.g., p-trifluoromethylphenyl).

The compounds of the instant invention are physiologically active steroids which possess anti-androgenic activity, i.e., they inhibit the action of androgens, and they may be used in the treatment of such conditions as hyperandrogenic acne. The compounds may be formulated for such administration, the concentration and/or dosage being based on the activity of the particular compound and the requirements of the patient. Thus, the compounds can be formulated for administration in the range of from about 0.1 mg./kg. up to about 500 mg./kg. The lower dosages are suitable for animals, whereas the higher dosages are suitable for humans. They can be formulated as capsules or pills.

To prepare the compounds of this invention, 3-oxa-A-norpregnane-5β-ol-2,20-dione is ketalized by treatment with ethylene glycol in an acid medium at elevated temperatures to yield 3-oxa-A-norpregnane-5β-ol-2,20-dione 20-ethylene ketal. This ketal is reacted with a hydrazine of the formula: R—NH—NH$_2$, wherein R is as hereinbefore defined; the reaction preferably being conducted at an elevated temperature, such as the reflux temperature of the reaction mixture. The process results in the preparation of new intermediates of this invention having the Formula II:

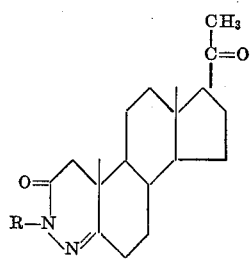

wherein R is as hereinbefore defined.

These intermediates are then reduced, as by treatment with lithium aluminum hydride to yield the final $\Delta^{1,4}$ products of the invention.

The following examples illustrate the invention (all temperatures being in degrees centigrade unless otherwise stated):

EXAMPLE 1

3-oxa-A-norpregnane-5β-ol-2,20-dione 20-ethylene ketal

A solution of 1 g. of 3-oxa-A-norpregnane-5β-ol-2,20-dione and 25 mg. of p-toluene sulfonic acid in 70 ml. of benzene and 3 ml. of ethylene glycol is stirred and refluxed for 4.5 hours and the water removed in a Dean-Stark water trap. The reaction mixture is diluted with water and the benzene layer separated. The aqueous layer is extracted with additional benzene and the combined benzene layers washed with 8% salt solution and evaporated in vacuo to give 3-oxa-A-norpregnane-5β-ol-2,20-dione 20-ethylene ketal.

EXAMPLE 2

3-4-diazapregn-4-en-2,20-dione

A solution of 0.8 g. of 3-oxa-A-norpregnane-5β-ol-2,20-dione 20-ethylene ketal in 15 ml. of 95% ethanol and 0.4 ml. of hydrazine hydrate is refluxed for 3.5 hours. The reaction mixture is diluted with water and extracted with chloroform. The chloroform extracts are washed with 8% salt solution, dried and evaporated. The residue is refluxed for 45 minutes in 250 ml. of methanol and 9 ml. of 8% sulfuric acid. The reaction mixture is cooled, neutralized with saturated sodium bicarbonate solution, concentrated in vacuo and diluted with water. The resulting precipitate is collected by filtration and plate chromatographed on neutral alumina using chlorform-3% methanol. Elution of the major band with ethyl acetate, evaporation, and crystallization of the residue from chloroform-isopropyl ether gives 214 mg. of 3,4-diazapregn-4-en-2,20-dione, M.P. 234–236° (d.). Recrystallization from chloroform-isopropyl ether gives the analytical sample having M.P. 234–236° (d.), $$[\alpha]_D^{22} + 111°$$

(ethanol); $\lambda^{\text{MeOH}}$ 243 m$\mu$ (8700);

$\tau_{\text{CDCl}_3}^{\text{TMS}}$ 9.35 (s., 18-Me), 8.92 (s., 19-Me) and 7.88 (s., 21-Me).

*Analysis.*—Calc'd. for $C_{19}H_{28}O_2N_2$: C, 72.11; H, 8.92; N, 8.85. Found: C, 72.22; H, 9.04; N, 8.85.

EXAMPLE 3

3-methyl-3,4-diazapregn-4-en-2,20-dione

A mixture of 400 mg. of 3-oxa-A-norpregnane-5β-ol-2,20-dione 20-ethylene ketal and 0.2 ml. of methylhydrazine in 5 ml. of ethanol is refluxed for 3.5 hours, diluted with water and extracted with chloroform. The chloroform extracts are washed with 8% salt solution, dried and evaporated. The residue is refluxed for 45 minutes in 125 ml. of methanol and 4.5 ml. of 8% sulfuric acid. The reaction mixture is cooled, neutralized with saturated sodium bicarbonate solution, concentrated in vacuo and diluted with water. The resulting precipitate is collected by filtration and plate chromatographed on neutral alumina using chloroform-3% methanol. Elution of the major band with ethyl acetate and evaporation gives 3-methyl-3,4-diazapregn-4-en-2,20-dione.

Similarly, by following the procedure of Examples 1, 2 and 7, but substituting the indicated hydrazine for the hydrazines used in the examples, the designated 3–R substituted 3,4-diaza-$\Delta^4$-pregna-2,20-dione and $\Delta^{1,4}$-derivatives are formed:

| Example: | Reactant | Product (R is) |
|---|---|---|
| 9 | Ethylhydrazine | Ethyl. |
| 10 | n-Hexylhydrazine | n-Hexyl. |
| 11 | Naphthylhydrazine | Naphthyl. |
| 12 | p-Tolylhydrazine | p-Tolyl. |
| 13 | Benzylhydrazine | Benzyl. |
| 14 | 2-chloroethylhydrazine | 2-chloroethyl. |
| 15 | (2,2,2-trifluoro-ethyl)-hydrazine | 2,2,2-trifluoroethyl. |
| 16 | o,p-Dibromophenylhydrazine | o,p-Dibromophenyl. |
| 17 | p-Chlorobenzylhydrazine | p-Chlorobenzyl. |
| 18 | p-Trifluoromethyl-phenylhydrazine | p-Trifluoromethylphenyl. |

EXAMPLE 4

3-phenyl-3,4-diazapregn-4-en-2,20-dione

Following the procedure in Example 3 but substituting phenylhydrazine for methylhydrazine, there is obtained the desired compound.

EXAMPLE 5

3-p-fluorophenyl-3,4-diazapregn-4-en-2,20-dione

Following the procedure in Example 3 but substituting p-fluorophenylhydrazine for methylhydrazine, there is obtained the desired compound.

EXAMPLE 6

3-methyl-3,4-diazapregna-1,4-diene-20-one

A solution of 400 mg. of 3-methyl-3,4-diazapregn-4-en-2,20-dione in 100 ml. of ether is treated with 150 mg. of lithium aluminum hydride in 10 ml. of ether for one minute. Ethyl acetate (100 ml.) is added to decompose excess hydride and this solution treated with 75 ml. of a saturated Rochelle salt solution. The organic layer is separated and the aqueous phase extracted with chloroform. The combined organic fractions are washed with 8% salt solution, dried and evaporated to dryness to give 3-methyl-3,4-diazapregna-1,4-diene-20-one.

EXAMPLE 7

3-phenyl-3,4-diazapregna-1,4-diene-20-one

Following the procedure in Example 6 but substituting 3-phenyl-3,4-diazapregn-4-en-2,20-dione for 3-methyl-3,4-diazapregn-4-en-2,20-dione, there is obtained the desired compound.

EXAMPLE 8

3-p-fluorophenyl-3,4-diazapregna-1,4-diene-20-one

Following the procedure in Example 6 but substituting 3 - p-fluorophenyl-3,4-diazapregn-4-en-2,20-dione for 3-methyl-3,4-diazapregn-4-en-2,20-dione, there is obtained the desired compound.

The invention may be variously otherwise embodied within the scope of the appended claims.

What is claimed is:

1. A compound having the formula:

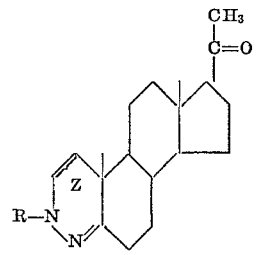

wherein R is lower alkyl, phenyl(lower alkyl), halolower alkyl, halophenyl, halophenyl(lower alkyl), or trifluoromethylphenyl; Z is selected from the group consisting of $$-CH=CH-$$

and $$-\overset{O}{\underset{\|}{C}}-CH_2-$$

2. A compound in accordance with claim 1 having the name 3,4-diazapregn-4-en-2,20-dione.

3. A compound in accordance with claim 1 having the name 3-methyl-3,4-diazapregn-4-en-2,20-dione.

4. A compound in accordance with claim 1 having the name 3-phenyl-3,4-diazapregn-4-en-2,20-dione.

5. A compound in accordance with claim 1 having the name 3-p-fluorophenyl-3,4-diazapregn-4-en-2,20-dione.

6. A compound in accordance with claim 1 having the name 3-methyl-3,4-diazapregna-1,4-diene-20-one.

7. A compound in accordance with claim 1 having the name 3-phenyl-3,4-diazapregna-1,4-diene-20-one.

8. A compound in accordance with claim 1 having the name 3-p-fluorophenyl-3,4-diazapregna-1,4-diene-20-one.

No references cited.

NICHOLAS S. RIZZO, Primary Examiner

U.S. Cl. X.R.

424—250